US010816737B2

(12) United States Patent
Heck et al.

(10) Patent No.: US 10,816,737 B2
(45) Date of Patent: Oct. 27, 2020

(54) REFLOW COMPATIBLE OPTICAL PACKAGING

(71) Applicant: Intel Corporation, Santa Clara, CA (US)

(72) Inventors: John Heck, Berkeley, CA (US); Hari Mahalingam, Fremont, CA (US); Paul Yu, Saratoga, CA (US); Kumar Satya Harinadh Potluri, Milpitas, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/225,248

(22) Filed: Dec. 19, 2018

(65) Prior Publication Data

US 2019/0121036 A1 Apr. 25, 2019

(51) Int. Cl.
*G02B 6/42* (2006.01)

(52) U.S. Cl.
CPC ........... *G02B 6/4206* (2013.01); *G02B 6/422* (2013.01); *G02B 6/4212* (2013.01); *G02B 6/4214* (2013.01)

(58) Field of Classification Search
CPC .. G02B 6/4206; G02B 6/4212; G02B 6/4214; G02B 6/422
USPC ........................................................... 385/31
See application file for complete search history.

(56) References Cited

U.S. PATENT DOCUMENTS

| | | | | |
|---|---|---|---|---|
| 4,146,301 A * | 3/1979 | Cherin | G02B 6/3806 385/59 |
| 6,349,165 B1 * | 2/2002 | Lock | G02B 6/0218 385/127 |
| 6,377,732 B1 * | 4/2002 | Li | G02B 6/132 385/49 |
| 9,459,177 B1 * | 10/2016 | Dong | G01M 11/30 |
| 2002/0123317 A1 * | 9/2002 | Tanimoto | H01P 3/081 455/252.1 |
| 2012/0027339 A1 * | 2/2012 | Mathai | G02B 6/125 385/14 |
| 2014/0341519 A1 * | 11/2014 | White | G02B 6/4403 385/114 |
| 2018/0136409 A1 * | 5/2018 | Mitose | G02B 6/3636 |

* cited by examiner

*Primary Examiner* — Jerry M Blevins
(74) *Attorney, Agent, or Firm* — Patent Capital Group

(57) ABSTRACT

In various embodiments, optical fibers may be placed into V-shaped grooves in a substrate. A lid may then be placed on top of the optical fibers to hold them accurately in place, and the lid may be attached to the substrate using a reflow solder technique. Epoxy may then be applied as a strain relief. Because the V-shaped grooves and optical waveguides are manufactured with precision on the same substrate, precise alignment between these two may be achieved. Because the epoxy is applied after reflow, the epoxy may not be exposed to reflow temperatures, which might otherwise cause the epoxy to distort during the cure process.

12 Claims, 5 Drawing Sheets

310
365
350
120
355
110
399
310
375
120
365

REFLOW COMPATIBLE OPTICAL PACKAGING

TECHNICAL FIELD OF THE INVENTION

Various embodiments relate to attaching optical signal fibers to an optical interface substrate, in a manner that improves accurate alignment and manufacturability when compared to previous techniques.

BACKGROUND

Modern optical fiber communications require very precise alignment between the optical fiber and the optical waveguide that interfaces with it. A misalignment of as little as a micrometer (micron) can produce a noticeable loss in signal strength through the coupling between the optical fiber and the optical waveguide. Conventional optical packaging designs may use active epoxy-based attachment methods to hold the optical fibers in their final alignment position. Epoxies used for this attach generally have a glass transition temperature of about 150 degrees Celsius, so exposing the epoxy to temperatures near or above that range during the cure process may cause the optical fibers to shift out of alignment.

However, the solder reflow process commonly used with printed circuit (PC) boards uses temperatures well above this level. To compensate for the resulting possible mis-alignment, lenses and other optics are sometimes used to expand the beam as it passes through the coupling. This increases the cost of manufacture, as well as creating a uniform but measurable signal loss through the coupling, even if the optical fiber is properly aligned.

BRIEF DESCRIPTION OF THE DRAWINGS

Some embodiments may be better understood by referring to the following description and accompanying drawings that are used to illustrate various embodiments. In the drawings.

DETAILED DESCRIPTION

Figure 1A:
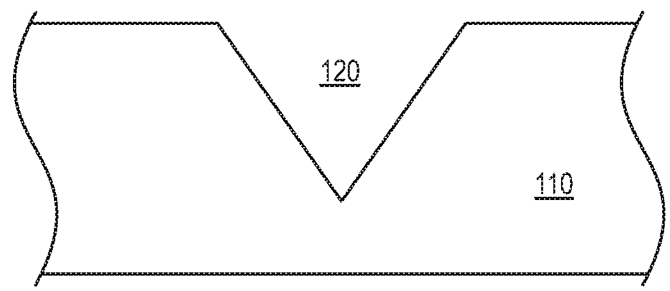
FIG. 1A shows a cross-section of a photonics integrated circuit substrate after a V-shaped groove has been etched into it, according to an embodiment.

In the following description, numerous specific details are set forth. However, it is understood that some embodiments may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments may be implemented fully or partially in software and/or firmware. In particular, the method claims may be performed by machines under the control of software and/or firmware. This software and/or firmware may take the form of instructions contained in or on one or more non-transitory computer-readable storage media. The instructions may be read and executed by one or more processors to enable performance by one or more devices of the operations described herein. The media may be internal or external to the device(s) containing the processor(s), and may be internal or external to the device(s) performing the operations. The instructions may be in any suitable form, such as but not limited to source code, compiled code, interpreted code, executable code, static code, dynamic code, and the like. Such computer-readable media may include any tangible non-transitory media for storing information in a form readable by one or more computers, such as but not limited to read only memory (ROM); random access memory (RAM); magnetic disk storage media; optical storage media; flash memory, etc.

Various embodiments may use multiple V-shaped grooves formed at the surface of a substrate, each groove to provide physical support and act as a guide for an individual optical fiber. By using parallel V-shaped grooves with defined spacing, the optical fibers in a fiber optic 'ribbon' may be easily laid into the grooves while maintaining the same spacing used in the ribbon. Since each V-shaped groove may be etched with high precision, the fiber within it may also be positioned with high precision.

Subsequent to placing the optical fibers in their respective grooves, a lid may be pressed down upon the portion of the optical fibers that extend above the V-shaped grooves, to hold each optical fiber securely in place. At the same time, the shape of the narrow bottom of the V may center the optical fiber both horizontally and vertically with high precision. To accommodate high-volume manufacturing processes, reflow solder compositions and epoxy mixtures may be chosen so that one operation is not disturbed by the heat of a subsequent operation.

FIG. 1A shows a cross-section of a photonics integrated circuit (IC) substrate 110 after a V-shaped groove 120 has been etched into it, according to one embodiment. Dimensions of depth, width, and angle of the V-shape may be chosen to be compatible with the dimensions of the optical fibers.

Figure 1B:
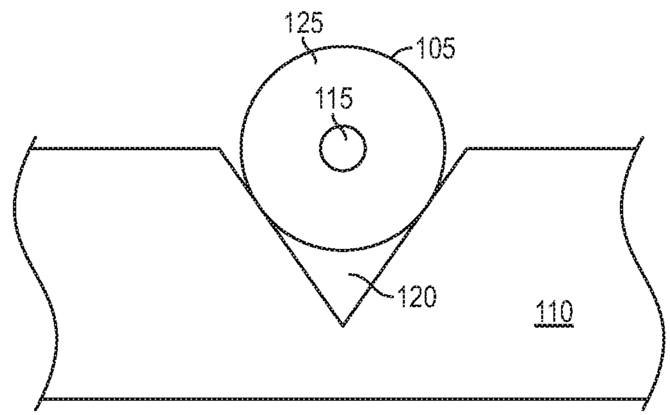
FIG. 1B shows a cross-section of the etched V-shaped groove after an optical fiber has been placed into the V-shaped groove, according to an embodiment.

FIG. 1B shows the etched V-shaped groove 120 after an optical fiber has been placed into it, according to an embodiment. Optical fiber 105 may comprise cladding 125 and internally reflecting core 115. Core 115 is shown at the same level as the surface of substrate 110, but various dimensions of the V-shape may be altered to raise or lower optical fiber 105 as needed to provide proper vertical alignment for other things, such as the optical waveguide described later.

NOTE: As used in this document, the term "optical fiber" shall include the internally reflecting core 115 and the cladding 125. The illustrated ratio of the diameter of the core to the diameter of the cladding is shown for ease of illustration. In an actual embodiment this ratio may be different than shown.

Figure 1C:
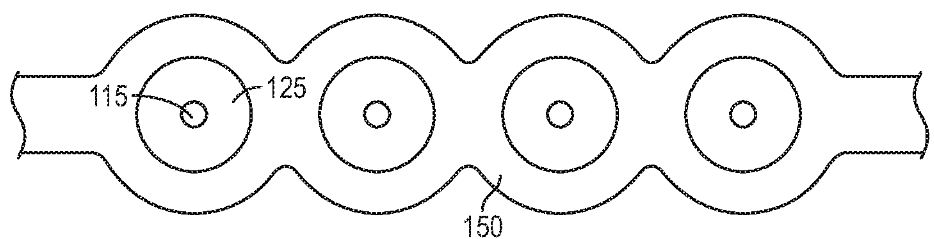
FIG. 1C shows a cross-section of a fiber optic ribbon with the ribbon material, according to an embodiment.

FIG. 1C shows a cross section of a fiber optic ribbon, according to an embodiment. In the illustrated embodiment, each optical fiber has a core 115 and cladding 125. But FIG. 1C also shows ribbon material 150 surrounding each optical fiber and physically coupling the optical fibers to each other. This material may serve various purposes, such as but not limited to: 1) keeping the optical fibers evenly spaced, 2) relieving physical stress that the optical fibers would otherwise be subjected to, and 3) through proper choice of materials, allowing the ribbon material to be easily removed to expose the individual optical fibers for their placement in the V-shaped grooves.

In this particular embodiment, ribbon material 150 is shown above and below the optical fibers with a wavy shape that follows the contours of the fibers, as well as being between the optical fibers. But other embodiments may use other configurations, such as but not limited to any combination of: 1) being located only between the optical fibers, 2) being located above the optical fibers with a flat surface, 3) being located below the optical fibers with a flat surface, 4) etc.

Figure 2:
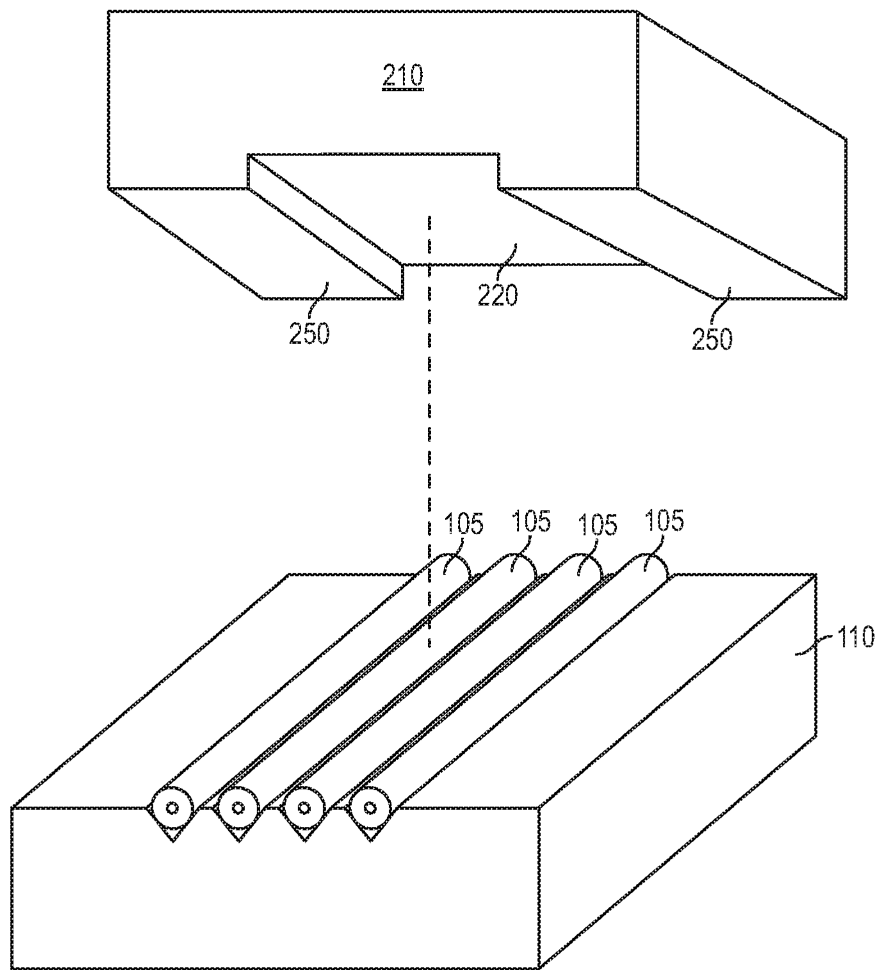
FIG. 2 shows an expanded view of the substrate, multiple optical fibers and a lid, according to an embodiment.

FIG. 2 shows an expanded view of the substrate 110, multiple optical fibers 105 inserted into their respective V-shaped grooves, and a lid 210, according to an embodiment. A recessed area 220 is shown on the bottom of the lid 210. The recessed area may be deep enough and wide enough so that the portion of every optical fiber 105 that extends above the surface of substrate 110 will fit within the recessed area when lid 210 is set onto substrate 110. The bottom portion of the lid that is outside the recessed area 220 may be used as an attachment surface to permanently attach the lid to the substrate.

In some embodiments, either the attachment area of the lid, the attachment area of the substrate, or both, may have a coating of metal, such as but not limited to solder, so that a heat-based reflow technique may be used to fasten the lid to the substrate. In some embodiments, the solder may include AuSn or AuIn, but other ingredients may be used.

As an alternative to creating a recess 220 on the underside of the lid 210, the attachment area of the substrate may be higher than the area into which the V-shaped grooves were etched, so that a lid with a flat underside will also create space for the raised portion of the optical fibers.

Regardless of where the recessed area is located, the space allowed by this recess may be sufficient so that a slight downward pressure is placed on the top of the optical fibers when the lid is in its final position, the pressure being sufficient to hold the optical fibers firmly in place within their V-shaped grooves. An example pressure may be 6-12 newtons, with 8-10 newtons being a particular embodiment, but other pressures may be used.

Although the optical fibers are shown in FIG. 2 as ending at two edges of a short substrate, this is only for simplicity of illustration of the cross section. Subsequent figures will show a more complete description of the overall assembly. In some embodiments, the lid may be comprised of glass or silicon, or other materials that have a coefficient of thermal expansion (CTE) similar to that of the substrate. This close match in CTEs may make the assembly subject to less stress due to temperature cycling.

Figure 3:
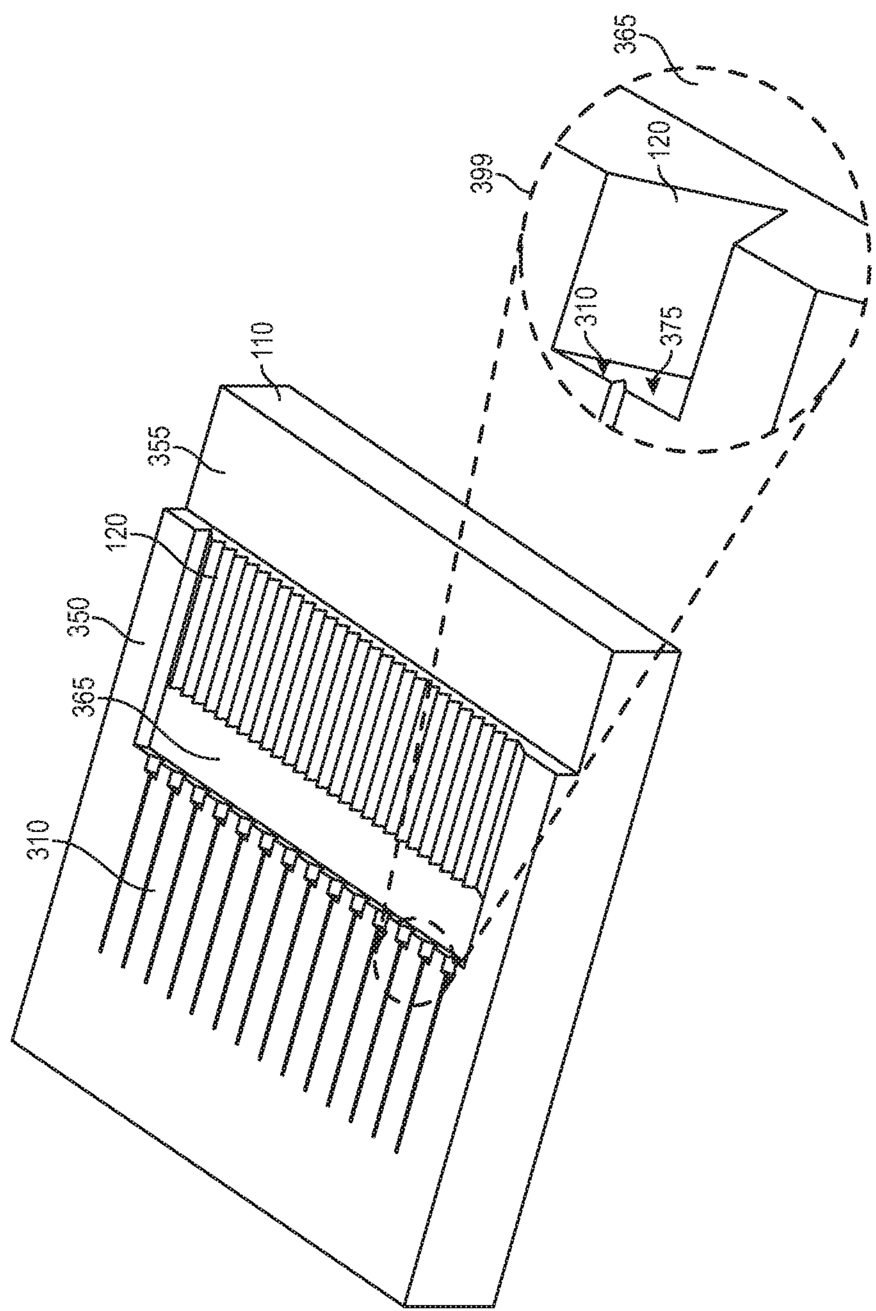
FIG. 3 shows a view of a fiber optic interface structure at the location where the fiber optic ribbon is joined to it, according to an embodiment.

FIG. 3 shows a view of a more complete fiber optic interface substrate after it has been prepared for connecting the optical fibers and lid, but before those items are actually connected. This view does not show the actual optical fibers or lid. In the illustrated embodiment, a number of V-shaped grooves 120 have been etched into substrate 110. At one end of the substrate, a trench 355 has been formed to allow space for the fiber ribbon to rest while keeping the actual optical fibers at the proper level for insertion into the V-shaped grooves. Trench 355 may also provide for strain relief where the fiber ribbon meets the V-shaped grooves.

This embodiment of FIG. 3 also shows a series of optical waveguides 310. Each of these optical waveguides may be used to pass an optical signal between an optical transmitter or receiver on the substrate (not shown, but located near the left of FIG. 3) and the end of an optical fiber from the ribbon (also not shown in this view, but to be located next to the right end of the optical waveguide). An optical waveguide may serve the same function as the core of an optical fiber (using reflections from the internal surface) to guide light signals through it, but the optical waveguide may be part of the integrated circuit rather than part of an external optical cable. In some embodiments, each optical waveguide may be formed by etching a groove (not the same as the V-shaped groves) into the substrate and filling the groove with an internally reflecting substance, but other methods may be used.

Some embodiments may also include a trench 365 for wafer level testing. Before attaching the optical fibers to the substrate, a probe for each optical waveguide may be lowered into trench 365 next to the end of the associated optical waveguide. Each probe may transmit optical signals into an optical waveguide that leads to an optical receiver on the integrated circuit, or may receive optical signals from the end of an optical waveguide that leads to an optical transmitter on the integrated circuit. In various embodiments, a single photonics IC may contain all transmit optical waveguides, all receive optical waveguides, or a mixture of transmit and receive optical waveguides.

FIG. 3 also shows two attach surfaces 350 on either side of the V-shaped groove area for attaching the lid 210 at surface 250. As previously described, the metal material may be included on the lid 210 and/or the substrate 110.

Enlargement 399 shows a more detailed view of an area where an optical waveguide 310 is to meet the end of an optical fiber. As shown, this area includes the end of a V-shaped groove so that the end of the associated optical fiber may rest in the V-shaped groove adjoining the end of the optical waveguide 310. The end of the V-shaped groove may serve as fiber stop 375. In some embodiments, the lid may extend over the end of the optical waveguides, to hold the optical fibers in place right up to the fiber stop.

Although the illustrated embodiment of FIG. 3 shows a trench 365 for wafer level testing, other embodiments may eliminate this trench, and the V-shaped grooves may extend continuously from the optical fiber strain relief trench to the end of the wave guides.

Figure 4:
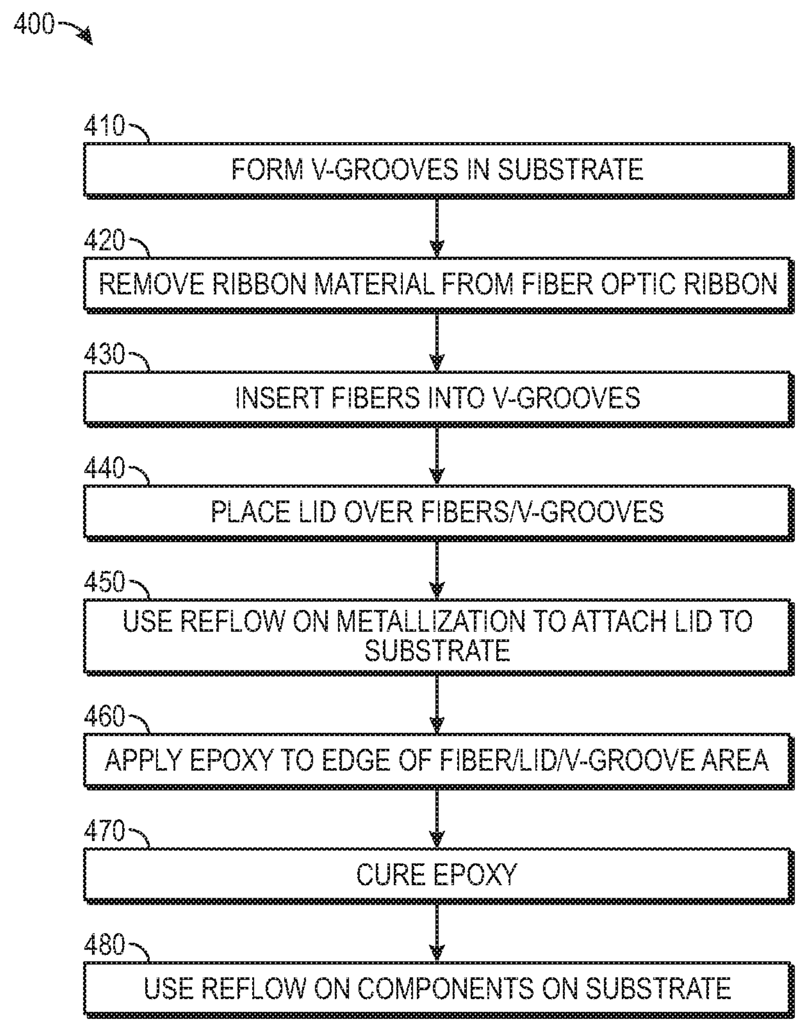
FIG. 4 shows a flow diagram of a method of assembling a fiber optic interface, according to an embodiment.

FIG. 4 shows a flow diagram of an assembly process, according to an embodiment. The operations described in FIG. 4 may be performed by one or more devices or machines. The operations may also be performed, either partially or fully, by one or more people. In the embodiment of flow diagram 400, at 410 a series of V-shaped grooves may be formed in a substrate. In some embodiments, the V-shaped grooves may be parallel to each other, and/or may be of the same size. In some embodiments, an etching process may be used to form the grooves.

At 420, ribbon material 150 may be removed from a fiber optic ribbon to expose the optical fibers 105. This is a separate operation from 410, and may be done before, after, or at the same time as 410. The result of this operation may be a fiber optic ribbon with the optical fibers extending from the end of the ribbon. At 430, the exposed optical fibers may be inserted into the V-shaped grooves 120 in the substrate. At 440, lid 210 may be placed over the area in which the optical fibers are inserted into the V-shaped grooves.

When the lid 210 is in position, the attach areas of the lid may be in contact with the attach areas of the substrate. At 450, a reflow process may be used to melt the metal material that is now in the contact positions of these attach areas. In some embodiments, this process may include heating the lid and substrate until the metal material melts, and then removing the heat until the metal material solidifies again. In some embodiments, this may be compared to the reflow process used on printed circuit (PC) boards to physically and electrically attach ICs and other components to the PC boards. In some embodiments, the metal material may be a type of solder that undergoes a change when it is melted and solidified, which causes it to have a higher melting point in the future.

After the lid is sufficiently attached to the substrate, at 460 an epoxy material may be applied. In some embodiments, the epoxy may be applied at the juncture of the optical fibers and the end of the V-shaped grooves, close to where the end of the lid covers the optical fibers. This placement may allow the epoxy material to wick underneath the lid, to fill in the air spaces between the optical fibers and lid. After the epoxy cures at 470, it may therefore provide further bonding between the lid and the substrate. In some embodiments, the epoxy may also spread onto the surface of the ribbon material to provide additional strain relief for the ribbon.

At 480, second reflow process may be used to physically and electrically attach electronic components to the substrate. In the illustration of FIG. 3, these components might be located to the left of the optical waveguides 310. In some embodiments, this second reflow may be done after the reflow of operation 450. In some embodiments, this may be done when the solder used in the reflow operation 450 has given that solder a higher melting point, thus insuring it will not re-melt when the reflow operation 480 takes place. In other embodiments, the re-flow process of 480 may be done before the reflow process of operation 450. In still other embodiments, the same reflow process may be used for both operations 450 and 480.

Figure 5:
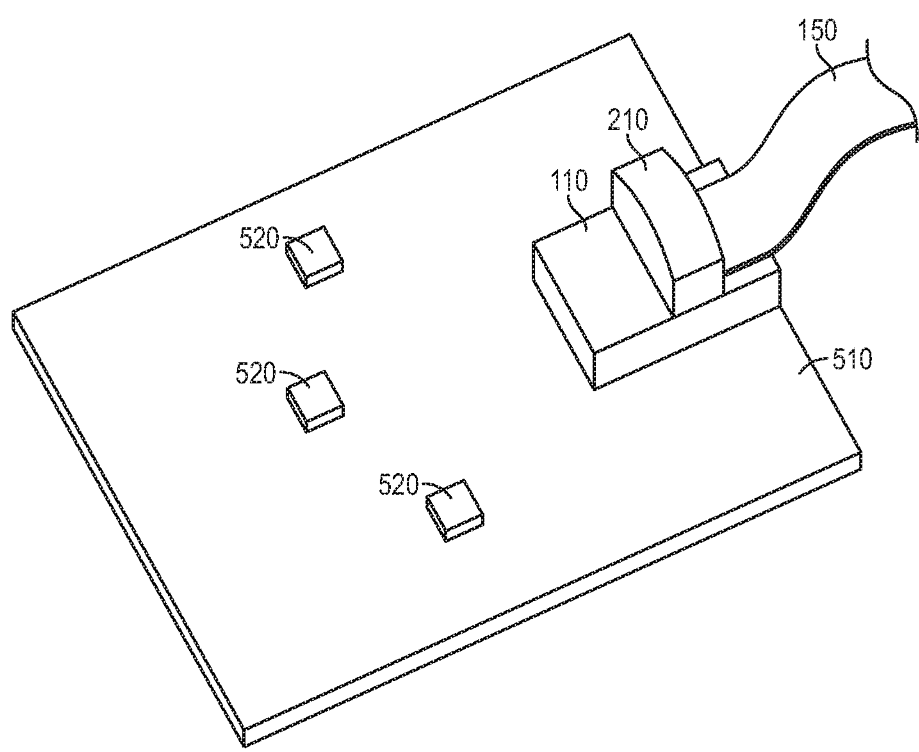
FIG. 5 shows a system with an optical fiber coupling assembly attached to a printed circuit board.

FIG. 5 shows a fiber optic coupling assembly mounted to a printed circuit board, according to an embodiment. In the illustrated embodiment, lid 210 and ribbon material 150 are shown attached to substrate 110. The substrate, in turn, is shown attached to a printed circuit board 510 with various other components 520 on the printed circuit board. Substrate 110 may be physically attached to the printed circuit board to maintain mechanical integrity, and may be electrically connected to the substrate to interface the board to optical signals external to the board.

EXAMPLES

Various embodiments may be described by, but are not limited to, the following examples.

Example 1 includes an optical coupling assembly comprising: a substrate with multiple grooves etched into a surface of the substrate, each groove having a V-shaped cross section, multiple optical fibers with each optical fiber placed in an associated groove with the optical fiber in contact with each side of the V-shaped groove, a lid located over the optical fibers and pressing each optical fiber down into the associated V-shaped groove, a metallic material positioned between the substrate and the lid to attach the lid to the substrate, and an epoxy material positioned at a juncture of the substrate, the lid, and the ribbon material to provide strain relief for the optical fibers.

Example 2 includes the optical coupling assembly of example 1, wherein the substrate further comprises multiple optical waveguides optically aligned with ends of the multiple optical fibers.

Example 3 includes the optical coupling assembly of example 1, wherein the substrate further comprises electronic circuitry to sense light traveling from the optical fibers through the wave guides.

Example 4 includes the optical coupling assembly of example 1, wherein the substrate further comprises electronic circuitry to generate light to travel through the wave guides to the optical fibers.

Example 5 includes the optical coupling assembly of example 1, wherein each optical fiber includes an internally reflective core and a cladding surrounding the core.

Example 6 includes the optical coupling assembly of example 5, wherein the multiple optical fibers are part of a fiber optic ribbon, with ribbon material removed from the cladding at areas of the optical fibers located in the V-shaped grooves.

Example 7 includes the optical coupling assembly of example 1, wherein said pressing each optical fiber comprises pressing with a force between 6 and 12 newtons.

Example 8 includes the optical coupling assembly of example 1, and further includes a printed circuit board to which the substrate is mounted.

Example 9 includes a substrate for an optical coupling assembly, wherein the substrate comprises multiple parallel grooves on a first surface of the substrate with each grove having a V-shaped cross section to receive an optical fiber, multiple optical waveguides on the first surface with each optical waveguide to communicate optical signals between one of the optical fibers and an optical transmitter or receiver, and at least one attachment area on the first surface to attach a lid over the grooves.

Example 10 includes the substrate of example 9, further including a first trench on the first surface at an end of the substrate, the first trench to receive a fiber optic ribbon.

Example 11 includes the substrate of example 9, further including a second trench on the first surface for wafer level testing.

Example 12 includes the substrate of example 9, having a metallic material AuSn at one or more attach areas of the substrate.

Example 13 includes the substrate of example 9, having a metallic material AuIn at one or more attach areas of the substrate.

Example 14 includes a method of assembling an optical fiber interface, the method comprising: pushing multiple optical fibers into multiple V-shaped grooves in a substrate with each optical fiber in a separate groove, placing a lid over the optical fibers to hold the optical fibers in place in the V-shaped grooves, and using a first reflow technique to attach the lid to the substrate, wherein the attached lid applies sufficient pressure to the optical fibers to hold the optical fibers in place in the V-shaped grooves.

Example 15 includes the method of example 14, further comprising: adding epoxy material where the optical fibers enter the V-shaped grooves, wherein the epoxy material is composed of a material that wicks into spaces between the optical fibers, the substrate, and the lid; and further comprises curing the epoxy.

Example 16 includes the method of example 14, wherein the first reflow technique comprises applying sufficient heat to cause a metal material to melt between the lid and substrate, and then removing the heat to solidify the metal material.

Example 17 includes the method of example 14, further comprising a second reflow technique to attach components to the substrate, the second reflow technique not causing the metal material to melt.

Example 18 includes the method of example 14, further comprising removing ribbon material from a fiber optic ribbon to expose the optical fibers, prior to said pushing.

Example 19 includes the method of example 14, wherein said pushing the optical fibers comprises placing an end of each optical fiber adjacent to an end of an optical waveguide in the substrate to provide optical coupling between the optical fiber and optical waveguide.

Example 20 includes the method of example 14, wherein the method further comprises inserting an optical probe into a trench in front of an end of an optical waveguide to calibrate light transference into or out of the optical waveguide.

Example 21 includes a computer-readable non-transitory storage medium that contains instructions, which when executed by one or more processors result in performing operations comprising: pushing multiple optical fibers into multiple V-shaped grooves in a substrate with each optical fiber in a separate groove, placing a lid over the optical fibers to hold the optical fibers in place in the V-shaped grooves, and performing a first reflow technique to attach the lid to the substrate.

Example 22 includes the medium of example 21, wherein the operations further comprise adding epoxy material where the optical fibers enter the V-shaped grooves, wherein the epoxy material is composed of a material that wicks into spaces between the optical fibers, the substrate, and the lid.

Example 23 includes the medium of example 21, wherein the operation of performing a first reflow technique comprises applying sufficient heat to cause a metal material to melt between the lid and substrate, and then removing the heat to solidify the metal material.

Example 24 includes the medium of example 21, wherein the operations further comprise performing a second reflow technique to attach components to the substrate.

Example 25 includes the medium of example 21, wherein the operations further comprise removing ribbon material from a fiber optic ribbon to expose the optical fibers, prior to the operation of pushing.

Example 26 includes the medium of example 21, wherein the operation of pushing the optical fibers comprises placing an end of each optical fiber adjacent to an end of an optical waveguide in the substrate to provide optical coupling between the optical fiber and optical waveguide.

The foregoing description is intended to be illustrative and not limiting. Variations will occur to those of skill in the art. Those variations are intended to be included in the various embodiments, which are limited only by the scope of the following claims.

What is claimed is:

1. An optical coupling assembly, comprising:

a substrate with multiple grooves etched into a surface of the substrate, each groove having a V-shaped cross section;

a fiber optic ribbon including multiple optical fibers, each optical fiber placed in an associated groove with the optical fiber in contact with each side of the V-shaped groove;

a lid located over the optical fibers and compressing each optical fiber down into the associated V-shaped groove;

a metallic material positioned between the substrate and the lid to attach the lid to the substrate; and an epoxy material positioned at a juncture of the substrate, the lid, and a ribbon material of the fiber optic ribbon to provide strain relief for the optical fibers.

2. The optical coupling assembly of claim 1, wherein the substrate further comprises multiple optical waveguides optically aligned with ends of the multiple optical fibers.

3. The optical coupling assembly of claim 1, wherein the substrate further comprises electronic circuitry to sense light traveling from the optical fibers through the wave guides.

4. The optical coupling assembly of claim 1, wherein the substrate further comprises electronic circuitry to generate light to travel through the wave guides to the optical fibers.

5. The optical coupling assembly of claim 1, wherein each optical fiber includes an internally reflective core and a cladding surrounding the core.

6. The optical coupling assembly of claim 5, wherein the ribbon material is removed from the cladding at areas of the optical fibers located in the V-shaped grooves.

7. The optical coupling assembly of claim 1, wherein said pressing each optical fiber comprises compressing with a force between 7 and 11 newtons.

8. The optical coupling assembly of claim 1, further comprising a printed circuit board to which the substrate is mounted.

9. A substrate for an optical coupling assembly, wherein the substrate comprises:

multiple parallel grooves extending in a longitudinal direction on a first surface of the substrate, each groove having a V-shaped cross section to receive an optical fiber;

multiple optical waveguides on the first surface, each optical waveguide to communicate optical signals between one of the optical fibers and an optical transmitter or receiver, each of the optical waveguides formed by etching a groove into the first surface of the substrate and being smaller than the grooves;

a trench on the first surface at an end of the substrate in the longitudinal direction, the trench to receive a fiber optic ribbon; and at least one attachment area on the first surface to attach a lid over the grooves.

10. The substrate of claim 9, further including a trench on the first surface for wafer level testing.

11. The substrate of claim 9, the substrate having a metallic material AuSn at the at least one attach area of the substrate.

12. The substrate of claim 9, the substrate having a metallic material AuIn at the at least one attach area of the substrate.

* * * * *